(12) United States Patent
Eslinger

(10) Patent No.: US 7,857,577 B2
(45) Date of Patent: Dec. 28, 2010

(54) SYSTEM AND METHOD OF PUMPING WHILE REDUCING SECONDARY FLOW EFFECTS

(75) Inventor: David Eslinger, Collinsville, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 921 days.

(21) Appl. No.: 11/676,589

(22) Filed: Feb. 20, 2007

(65) Prior Publication Data

US 2008/0199300 A1    Aug. 21, 2008

(51) Int. Cl.
   *F04D 17/08* (2006.01)

(52) U.S. Cl. .................. 415/1; 415/199.3; 415/208.3; 416/1; 416/231 B; 416/235; 416/236 R

(58) Field of Classification Search .......... 415/1, 415/148, 208.3, 199.2, 199.3, 211.1, 211.2, 415/209.1; 416/1, 181, 182, 185, 231 R, 416/231 B, 235, 236 R
See application file for complete search history.

(56) References Cited

U.S. PATENT DOCUMENTS

| | | | | |
|---|---|---|---|---|
| 1,622,930 A | * | 3/1927 | Von Karman et al. | 416/183 |
| 2,450,143 A | * | 9/1948 | Eliot et al. | 415/146 |
| 3,522,997 A | * | 8/1970 | Rylewski | 415/72 |
| 3,749,520 A | * | 7/1973 | Bandukwalla | 416/183 |
| 4,740,138 A | * | 4/1988 | Zaehring et al. | 415/12 |
| 5,178,516 A | * | 1/1993 | Nakagawa et al. | 415/208.3 |
| 5,310,309 A | * | 5/1994 | Terasaki et al. | 415/208.3 |
| 5,383,764 A | * | 1/1995 | Ogawa et al. | 415/199.3 |
| 5,529,457 A | * | 6/1996 | Terasaki et al. | 415/208.3 |
| 5,628,616 A | | 5/1997 | Lee | |
| 6,860,715 B2 | * | 3/2005 | Sekularac | 415/115 |
| 6,893,207 B2 | | 5/2005 | Kao | |
| 6,971,848 B2 | | 12/2005 | Watson | |
| 7,117,120 B2 | | 10/2006 | Beck et al. | |
| 2004/0213661 A1 | | 10/2004 | Sekularac | |
| 2006/0196668 A1 | | 9/2006 | Burge et al. | |

FOREIGN PATENT DOCUMENTS

| | | |
|---|---|---|
| CA | 2382739 | 11/2006 |
| DE | 150495 | 9/1981 |
| DE | 19548852 | 7/1997 |
| GB | 256647 | 10/1926 |
| GB | 942648 | 11/1963 |
| GB | 2017550 A | 10/1979 |
| GB | 2080165 A | 2/1982 |
| GB | 2094896 A | 9/1982 |
| JP | 04334797 A | 11/1992 |
| JP | 10331794 A | 12/1998 |
| RU | 63468 U1 | 5/2007 |
| SU | 1257296 A1 | 9/1986 |
| WO | 03076811 | 9/2003 |
| WO | 2005035993 A1 | 4/2005 |

* cited by examiner

*Primary Examiner*—Igor Kershteyn
(74) *Attorney, Agent, or Firm*—Kevin B. McGoff; Rodney V. Warfford

(57) ABSTRACT

A technique improves the pumping performance of a centrifugal pump in a cost-effective manner. The centrifugal pump comprises a pumping component having one or more vanes defining fluid flow paths. A passage is formed through at least one vane such that an end of the passage is exposed to a low energy flow, i.e. secondary flow, region. Each passage enables the flow of a small amount of fluid from the low energy region to an opposite side of the vane to reduce the secondary flow effects and improve pumping efficiency.

12 Claims, 3 Drawing Sheets

SYSTEM AND METHOD OF PUMPING WHILE REDUCING SECONDARY FLOW EFFECTS

BACKGROUND

Centrifugal pumps are used in many environments to pump a variety of fluids. For example, centrifugal pumps are used for electric submergible pumps placed within wells or in other submerged environments. The electric submergible pumps often are used in the production of petroleum or in the transfer of other fluids in well related environments.

Electric submergible pumps are formed with multiple pump stages that each have an impeller and a diffuser. Each pump stage can experience hydraulic losses due to secondary flow patterns that develop within the stage. Common causes of secondary flow are Coriolis forces in impellers as well as the curvature of vanes and passages in both impellers and diffusers. The secondary flow commonly has a lower velocity than the core flow and often collects at the suction/hub corner in diffusers and at the suction/shroud corner in impellers.

SUMMARY

In general, the present invention provides a cost-effective technique for improving the pumping efficiency of centrifugal pumps. A passage is formed through one or more vanes of a pump component. One end of each passage is exposed to a low energy flow, i.e. secondary flow, region along the vane. Each passage enables the flow of a small amount of fluid from the low energy region to an opposite side of the vane to reduce the secondary flow effects and improve pumping efficiency.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for pumping fluids. A centrifugal pump utilizes pump components, such as impellers and/or diffusers, having passages oriented to reduce hydraulic losses due to secondary flow patterns. The secondary flow patterns create low energy fluid flow regions within the stages of the centrifugal pump. The low energy flow regions may develop along flow inducing or directing vanes within individual stages of the centrifugal pump. Higher energy fluid flow regions often are located immediately across the vane in an adjacent flow path. One or more passages can be formed through the vane and into communication with the low energy flow region. These passages enable a small amount of fluid to pass from the low energy flow region on one side of the vane to an opposite side of the vane, thereby reducing hydraulic losses otherwise associated with the low energy flow region.

Figure 1:
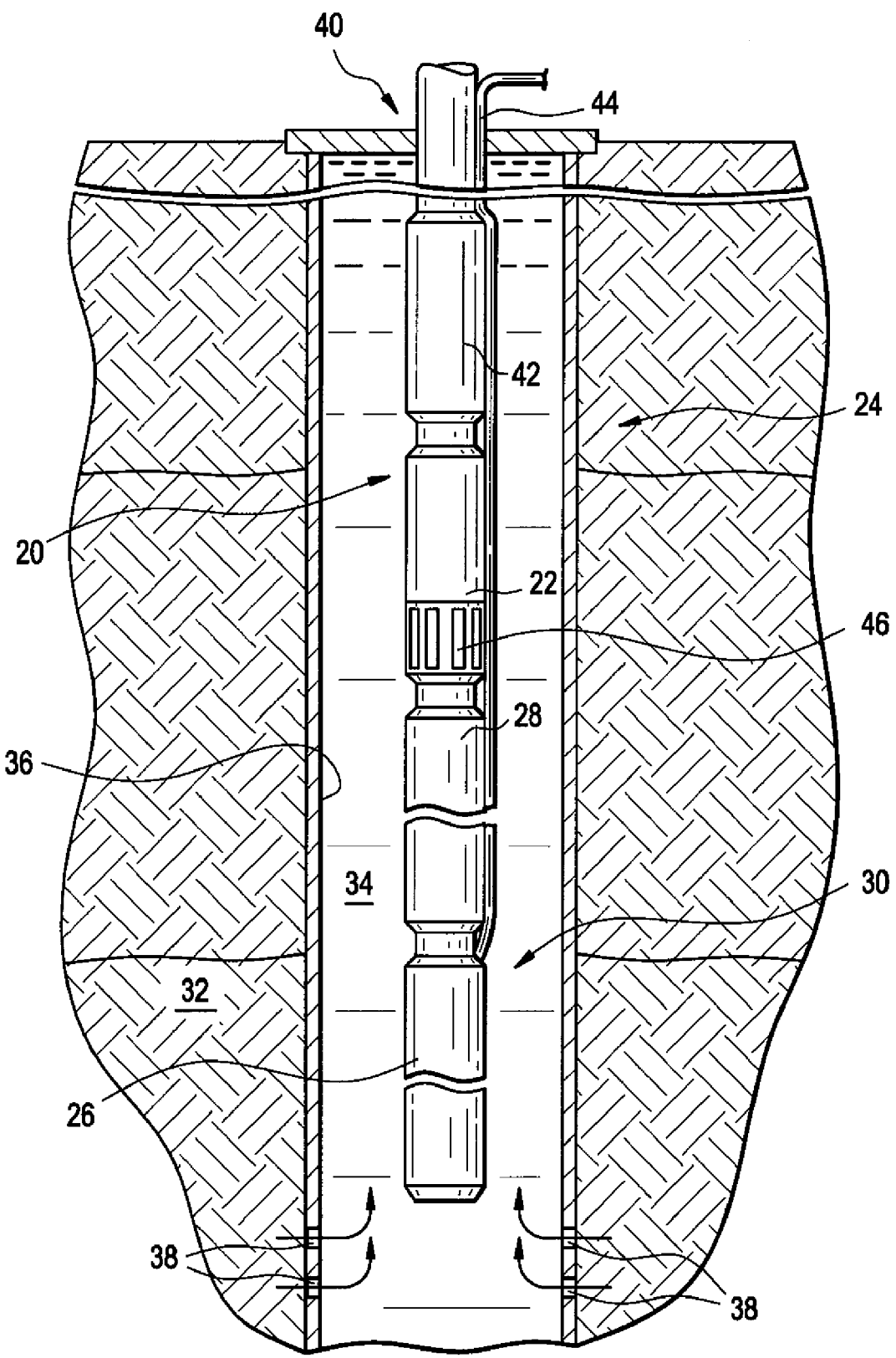
FIG. 1 is a front elevation view of an electric submergible pumping system deployed in a wellbore and having a centrifugal pump, according to an embodiment of the present invention.

Referring generally to FIG. 1, one embodiment of a centrifugal pump deployed in a pumping application is illustrated. In this embodiment, a centrifugal pump 20 is utilized in a well environment. Centrifugal pump 20 is formed as an electric submergible pump 22 coupled into an electric submergible pumping system 24. Electric submergible pumping system 24 may comprise a variety of components depending on the particular application or environment in which it is used. By way of example, electric submergible pumping system 24 comprises a submergible motor 26 to power submergible pump 22. Additionally, a motor protector 28 may be positioned between submergible motor 26 and submergible pump 22 to protect the internal motor oil of submergible motor 26 and to balance internal and external pressure differentials.

In the embodiment illustrated, electric submergible pumping system 24 is designed for deployment in a well 30 formed within a geological formation 32 containing desirable production fluids, such as hydrocarbon based fluids. The electric submergible pumping system 24 actually is deployed in a wellbore 34 drilled into geological formation 32. In some applications, a wellbore casing 36 is used to line the wellbore 34. A plurality of openings or perforations 38 is formed through wellbore casing 36 to accommodate fluid flow between the surrounding geological formation 32 and wellbore 34.

The electric submergible pumping system 24 is deployed in wellbore 34 by an appropriate deployment system 40. Depending on the application, deployment system 40 may comprise cable, production tubing, coil tubing, or other appropriate deployment systems. Deployment system 40 is coupled to electric submergible pump 22 or to another appropriate component of pumping system 24 by a connector 42. Power is provided to submergible motor 26 via a power cable 44. The submergible motor 26, in turn, powers submergible pump 22 which draws fluid in through a pump intake 46. The fluid can be pumped to a desired location via, for example, tubing forming deployment system 40.

The illustrated centrifugal pump 20 and electric submergible pumping system 24 are examples of many potential centrifugal pumps, pumping systems, and pumping applications. For example, centrifugal pump 20 can be utilized in many types of pumping applications, including production applications, injection applications, fluid transfer applications and other pumping applications. Additionally, electric submergible pumping system 24 may comprise additional or alternate components depending on the specific pumping application and pumping environment.

Figure 2:
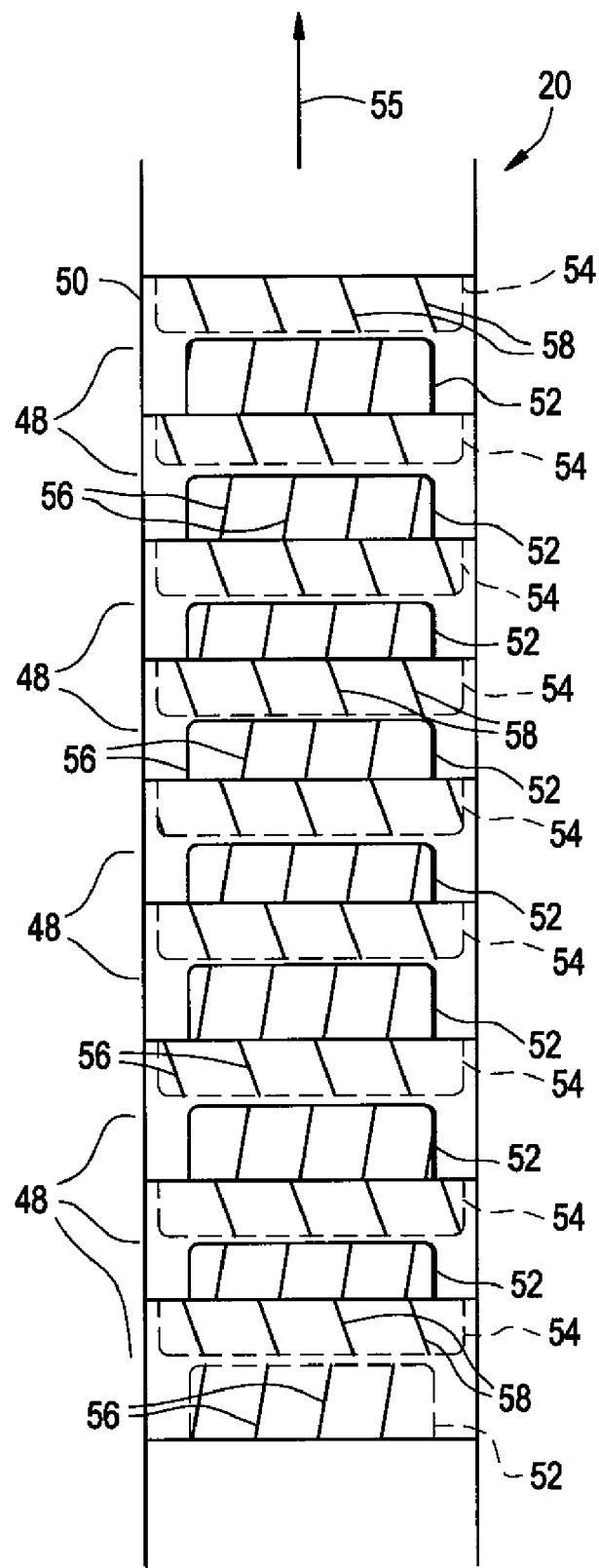
FIG. 2 is a schematic front elevation view of a centrifugal pump having a plurality of stages each containing an impeller and a diffuser, according to an embodiment of the present invention.

As illustrated in FIG. 2, centrifugal pump 20 comprises at least one stage and usually a plurality of stages 48 disposed within an outer pump housing 50. Each stage 48 comprises pump components for inducing and directing fluid flow. As illustrated, the pump components in each stage comprise an impeller 52 and a diffuser 54. Impellers 52 are rotated by an appropriate power source, such as submergible motor 26, to pump fluid through centrifugal pump 20 in the direction of arrow 55. Each rotating impeller 52 moves fluid from the upstream diffuser 54 into and through the downstream diffuser 54 and into the next impeller until the fluid is expelled from centrifugal pump 20. The impellers 52 utilize vanes 56 contoured to capture and move fluid in the desired direction as the impellers are rotated. The diffusers 54 also comprise vanes 58 contoured such that each diffuser directs the flow of fluid from the upstream impeller to the next sequential impeller until the fluid is expelled from the centrifugal pump.

The impeller vanes 56 and the diffuser vanes 58 can have secondary flow patterns that develop within stages 48. The secondary flow patterns result in regions of lower velocity and thus lower energy flow relative to the core flow through centrifugal pump 20. Commonly, a higher energy fluid flow region is located immediately across a given vane from the low energy flow region. The secondary flow patterns create hydraulic losses and thus a reduced pumping efficiency.

Figure 3:
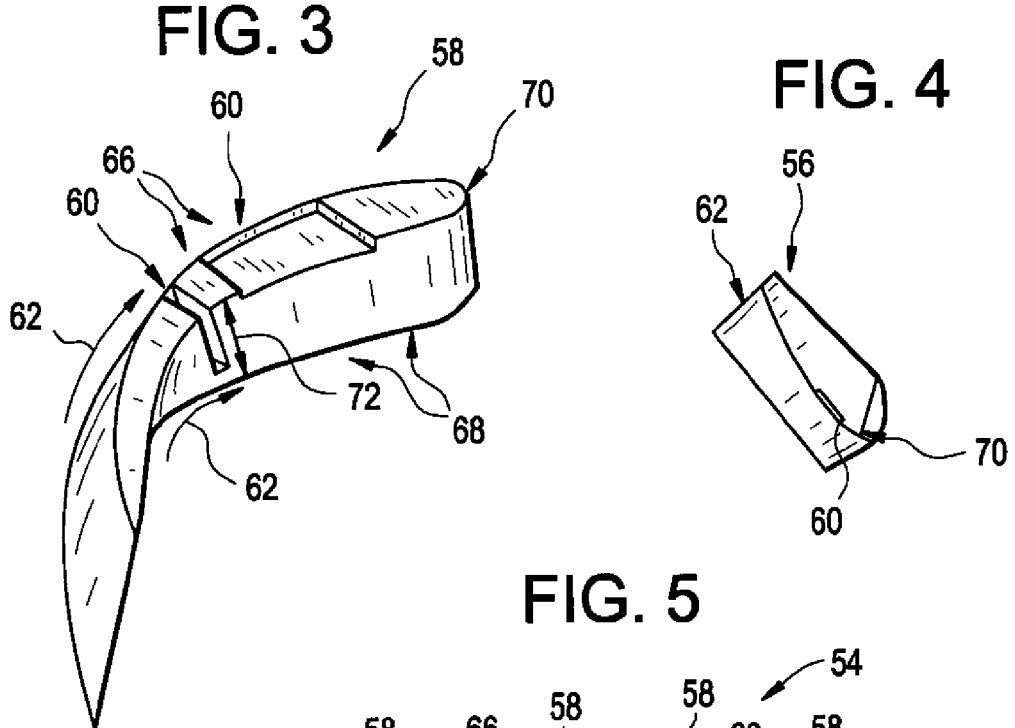
FIG. 3 is an orthogonal view of a pump component vane having a passage extending through the vane to a low energy flow region, according to an embodiment of the present invention.

As illustrated in FIG. 3, one or more passages 60 are disposed in selected vanes 56 and/or 58. For the purpose of explanation, the vane illustrated in FIG. 3 has been labeled a diffuser vane 58 but the discussion also applies to impeller vanes 56. Vane 58 separates adjacent, sequential flow paths 62, and passages 60 extend through or across vane 58 between flow paths 62. Each passage 60 extends into fluid communication with a secondary flow or low energy fluid flow region 66. In this example, passages 60 extend through the vane from low energy fluid flow region 66 in flow path 62 to a relatively high energy fluid flow region 68 in the next sequential flow path 62 on an opposite side of the vane. The passage or passages 60 allows a small amount of fluid to pass from low energy region 66 to an opposite side of the vane, resulting in reduced hydraulic losses.

A variety of passage designs can be used to reduce hydraulic losses. For example, one of the passages 60 illustrated in FIG. 3 is disposed along a base 70 of the vane and is generally low lying relative to the base. The other illustrated passage 60 is formed with a dimension that extends a greater distance relative to base 70. For example, the second passage 60 has a dimension greater than twenty five percent of a meridional extent 72 of the vane. Base 70 can be a hub base or a shroud base depending on the pump component in which passages 60 are formed.

Figure 4:
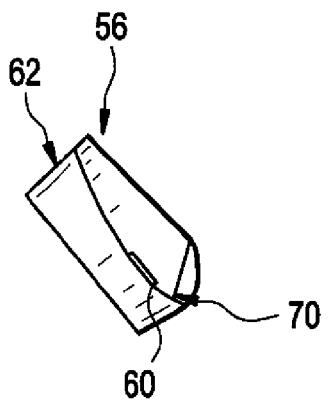
FIG. 4 is an orthogonal view of a portion of a pump component with a vane comprising the passage, according to an embodiment of the present invention.

The number of passages 60 used in a given vane also can vary. As illustrated in FIG. 4, for example, a single passage 60 is disposed through vane 56 of one of the impellers 52. The passage or passages 60 can be disposed through single vanes, selected vanes, or all of the vanes utilized in a given impeller 52 and/or diffuser 54. Additionally, passages 60 can be used in only the impellers, only the diffusers, or in both the impellers and the diffusers within centrifugal pump 20.

Figure 5:
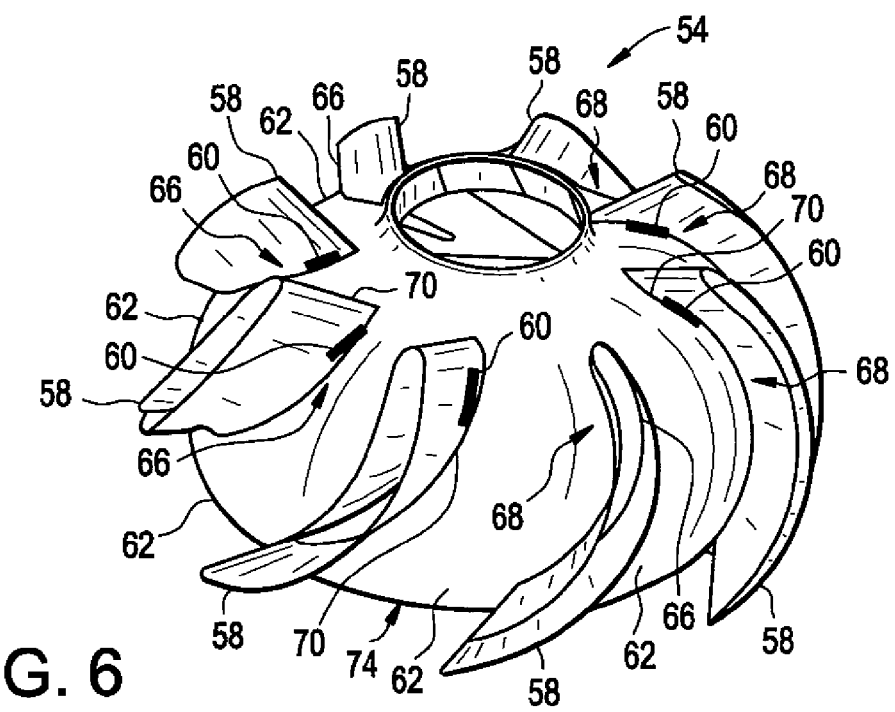
FIG. 5 is an orthogonal view of another pump component with vanes comprising the passage, according to an embodiment of the present invention.

As illustrated in FIG. 5, for example, individual passages 60 are disposed through each vane 58 of the diffuser 54. In this embodiment, passages 60 are disposed along bases 70 of vanes 58 proximate a hub 74 of diffuser 54. The hub side passages are positioned to correct a suction/hub side corner separation, i.e. secondary flow, which can create hydraulic losses in the pump stage. However, additional passages or other passage configurations can be used depending on the design of the impeller, the contour of the vanes, and the pumping efficiency parameters.

Figure 6:
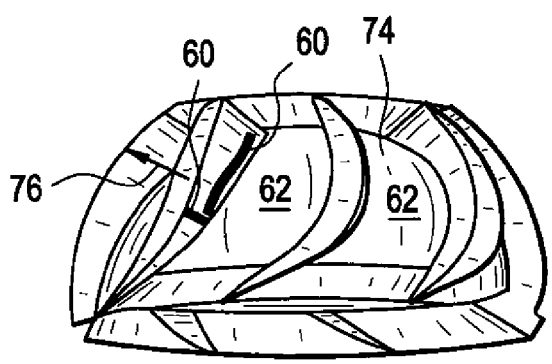
FIG. 6 is a front view of a pump component illustrating orientation of the passage to enable sand casting of the pump component, according to an embodiment of the present invention.

In the impeller and diffuser embodiments illustrated, the passages 60 have geometries and orientations selected to enable sand casting of the pump components without requiring subsequent machining. The ability to form the entire pump component, e.g. pump impeller or pump diffuser, in a sand casting procedure enables production of cost-effective pump impellers and pump diffusers by avoiding subsequent formation procedures, e.g. machining procedures, to form the passages 60. Passages 60 are designed with a geometry and orientation to enable a sand casting procedure in which removal of a vane passage insert from a sand core does not disturb the sand core. This allows the entire pump impeller 52 or pump diffuser 54, including passages 60, to be formed during a single sand casting procedure. As illustrated in FIG. 6, each of the passages 60 is oriented along a vane insert pull angle 76. The vane insert pull angle 76 is selected according to the design of the impeller 52 or diffuser 54 to enable a clean removal of the vane passage insert during the sand casting procedure. It should be noted that casting techniques other than sand casting techniques also can be used in some pump component formation applications.

The use of pump components having vanes with passages positioned to reduce the detrimental effects of secondary flow provides a cost effective approach to improving pumping efficiency of centrifugal pumps. Additionally, by orienting the passages along a suitable vane insert pull angle 76, the cost of manufacturing these pump components also can be reduced. The size and shape of the pump components as well as the number and contour of pump component vanes 56, 58 can be adjusted depending on factors such as the desired centrifugal pump design and the environment in which the centrifugal pump is utilized. Furthermore, the number, location and configuration of passages 60 can be adjusted according to the vane configuration and contour as well as other pumping parameters.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of improving the performance of a centrifugal pump, comprising:
   providing a pump diffuser with a plurality of vanes; and
   creating a passage through one or more vanes of the plurality of vanes to enable flow of a small amount of fluid through the one or more vanes, wherein creating comprises orienting each passage to enable sand casting such that removal of a vane passage insert from a sand core does not disturb the sand core.

2. The method as recited in claim 1, wherein creating comprises forming the meridional dimension of the passage through at least twenty five percent of the meridional length of the vane.

3. The method as recited in claim 1, wherein creating comprises creating the passage in each vane of the plurality of vanes.

4. The method as recited in claim 1, wherein creating comprises creating the passage along a base of the vane.

5. The method as recited in claim 1, wherein creating comprises orienting each passage between a low energy flow region on one side of the vane and a high energy flow region on an opposite side of the vane.

6. A method of improving the performance of a centrifugal pump, comprising:
provide a rotatable pump impeller with a plurality of vanes which extend from a hub base and are rotatable in a centrifugal pump; and
creating a passage through one or more vanes of the plurality of vanes such that the passage extends through at least twenty five percent of a dimension of a vane measured in a direction extending away from the hub base, wherein creating comprises creating the passage along each base of the one or more vanes.

7. The method as recited in claim 6, wherein creating comprises creating the passage in each vane of the plurality of vanes.

8. The method as recited in claim 6, wherein creating comprises creating the passage along a base of the vane.

9. The method as recited in claim 6, wherein creating comprises orienting each passage between a low energy flow region on one side of the vane and a high energy flow region on an opposite side of the vane.

10. The method as recited in claim 6, wherein creating comprises orienting each passage to enable sand casting such that removal of a vane passage insert from a sand core does not disturb the sand core.

11. A device, comprising:
a pump component having a plurality of vanes arranged to create fluid flow paths, each of the vanes having a passage, each passage extending through a vane between the fluid flow paths separated by the vane, wherein the plurality of vanes extends from a hub base of the pump component, the passage of each vane being oriented to begin at the hub base and to extend from the hub base through at least twenty five percent but less than one hundred percent of a dimension of each vane measured in a direction extending away from the base hub.

12. The device as recited in claim 11, wherein the pump component comprises at least one of a pump impeller and a pump diffuser.

\* \* \* \* \*